June 18, 1957 A. E. R. ARNOT 2,796,577
STORAGE BATTERY CHARGING DEVICE
Filed May 4, 1954 2 Sheets-Sheet 1
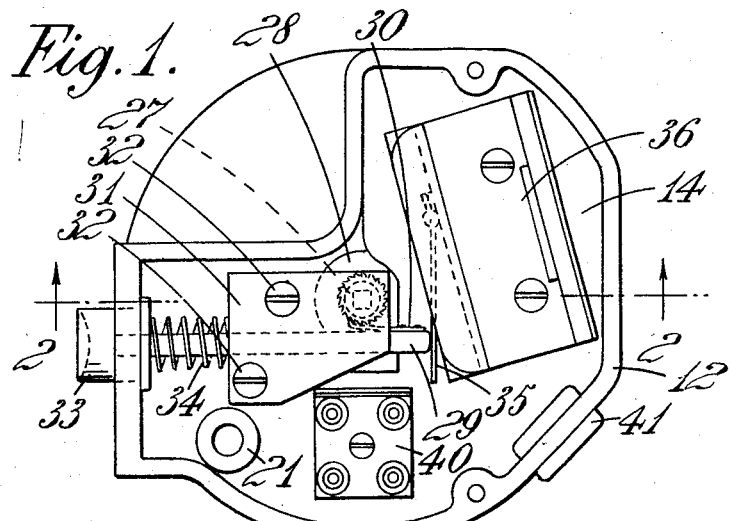
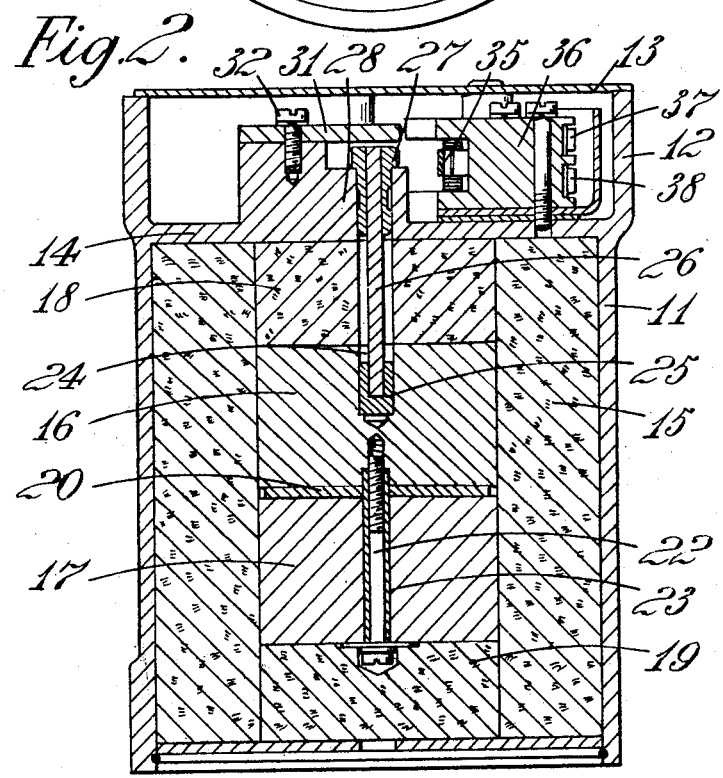

United States Patent Office 2,796,577
Patented June 18, 1957

2,796,577

STORAGE BATTERY CHARGING DEVICE

Alfred Erwin Reginald Arnot, Basingstoke, England, assignor to Emmanuel Kaye and John Reginald Sharp, both of Basingstoke, England Application May 4, 1954, Serial No. 427,615

Claims priority, application Great Britain May 5, 1953

6 Claims. (Cl. 320—40)

This invention comprises improvements in or relating to storage battery charging devices.

When storage batteries are being charged it is desirable to give them a certain amount of overcharge, as is well-known, but the overcharge should not be excessive. Various devices have been suggested for automatically allowing a certain amount of overcharge and then cutting off the charging current, but these devices as hitherto proposed, suffer from various disadvantages. For example, an ampere-hour meter mounted on a stationary charger must be manually set to put the required number of ampere-hours of charge back into the battery, but the number of ampere-hours which have been discharged are not known and therefore the setting cannot be accurate; if, to overcome this, an ampere-hour meter is mounted on a vehicle where it can measure the amount of discharge, it has been found that the instrument cannot be made sufficiently rugged to withstand the shocks and vibrations to which it is subject. Another devices comprises a relay set to the critical battery voltage, which energizes a time switch at this point of charge; the switch operates to cut off the charger at a pre-set time after it has been started. This device, although rather complex, is found to be satisfactory for stationary chargers, but the mechanism is not sufficiently robust for chargers mounted on vehicles or otherwise subject to shocks or vibration.

It is an object of this invention to provide a simpler and more robust device for the purpose in view.

The present invention comprises a battery-charging control device having in combination contacts which can operate to cut off battery charging current, means to set the contacts for charging, means to operate the contacts to cut off charging which comprise a thermally responsive element and means for applying heat to the said element dependent upon the battery voltage so that after a time the element will respond and allow the contacts to operate to cut off charging current.

The means to apply heat to the said element dependent upon the battery voltage may conveniently consist of a resistance element which has a non-linear voltage characteristic so that it gets hot quickly as soon as the voltage applied to it exceeds a critical amount. Such materials are well known in the electrical art. One such material which is particularly well-known is that sold under the trademark "Thyrite," a ceramic-like silicon carbide non-linear resistor material.

Preferably a variable resistance is included in series with the resistance element for the purpose of enabling the time of operation of the device to be pre-set. The thermally-responsive element may, for example, consist of a block of readily-fusible metal and an element held by said block from movement as long as the metal is in the solid state, but free to move when the metal is melted. Such elements are known per se, and any such device which has a suitable time delay as hereinafter explained may be adopted according to the present invention. Preferably, the thermally responsive element and means for applying heat thereto are incorporated in a thermally-insulated casing, for example thick solid cork material.

Conveniently the device according to the present invention includes means whereby after it has been operated and has cooled against the contact can readily be reset.

The following is a description by way of example of one construction of battery charging control device in accordance with the invention:

In the accompanying drawing:

Figure 1 is a plan of the device with the top cover removed,

Figure 2 is a section upon the line 2—2 of Figure 1, and

Figure 3:
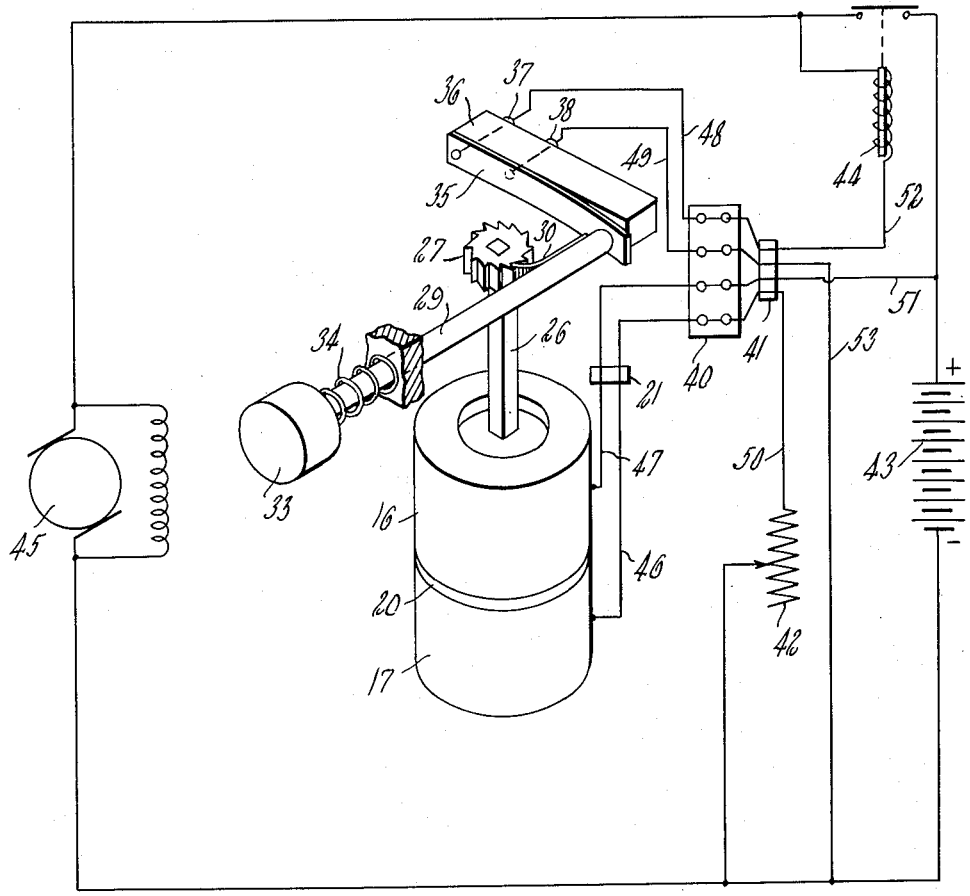
Figure 3 is a circuit diagram showing a typical application of the device of the invention.

The device comprises a receptacle 11 which may be of cast metal or of a moulded plastic material and which has a cylindrical main portion and an enlarged hollow top portion 12 which is closed by a metal lid 13 held in place by screws. The top portion 12 of the device is separated from the cylindrical portion 11 by a partition 14 so that the top portion constitutes in effect a hollow box. The cylindrical receptacle 11 is lined with thick cork 15, having a cylindrical interior which contains two metallic terminal blocks 16, 17 enclosed between cork pads 18, 19. The terminal blocks 16, 17 are separated by a disc 20, made of the before-mentioned material, such as "Thyrite", to provide a resistance element preferably having a non-linear voltage characteristic. The partition 14 contains an insulating bush 21 through which leads 46, 47 (Fig. 3) are taken down through the cork 15, one to the lower block 17 and one to the upper block 16. The leads are secured to the blocks by screws which do not appear in Figs. 1 and 2 as the section 2—2 on which Figure 2 is taken is looking the other way. Current can therefore be passed through the disc 20 from one block to the other and the leads are connected up through a variable resistance 42 to a battery 43 which is being charged so that the battery voltage is applied to the disc 20.

The assembly of the blocks 16, 17 and disc 20 is held firmly together by a screw 22 which is insulated from the block 17 by an insulating bush and washer 23. The block 16 contains a cavity 24 which is partly filled with an easily fusible alloy 25.

Dipping into the alloy is a square shaft of insulating material 26 which passes up through the cork disc 18 through a central aperture in the partition 14 and fits into a ratchet wheel 27 supported in a block 28 moulded out of the same material as the partition 14 so that it stands up above the level of the partition.

The upper surface of the block 28 is groved out, as can be seen in Figure 1, to receive a push-rod 29. On the side of the push-rod there is secured a spring pawl 30 which is intended to engage the teeth of the ratchet wheel 27. The slidable push-rod 29 is held down in the slot of the block 28 by a cap-plate 31 and screws 32. It carries a push button head 33 which passes through the wall 12 of the upper part of the receptacle, and it is urged in the outward direction by a spring 34. The inner end of the push-rod 29 bears on the operating arm 35 of a microswitch 36 secured inside the hollow top 12. The microswitch has terminal screws 37, 38 (Figure 2) and leads 48, 49 (Fig. 3) connect the screws 37, 38 to terminals on an insulating terminal block 40, seen in Figure 1. The leads 46, 47 which pass through the bush 21 are also connected to terminals on the block 40 and an insulating bush 41 in the wall 12 permits leads 50, 51, 52, 53 (Fig. 3) to be taken into the top of the device and coupled as required to the terminals on the block 40. The leads 52, 53 which are connected via block 40 to leads 48, 49 and the microswitch 36, are connected to suitable control means such as relay 44 for a battery charger generator 45 so that when the micro-switch is closed the charging circuit connecting battery 43 to said generator is completed and when the micro-switch is opened the charging circuit is broken.

In operation, assuming that it is desired to charge a battery to which the device is connected, the push-button 33 is pressed in. This closes the micro-switch 36 and starts battery charging. When the pressure on the push-button is taken away, the push-rod 29 and the button 33 remain pressed in because the pawl 30 engages one of the teeth of the ratchet wheel 27 and holds said push rod inwards against the pressure of the spring 34.

Charging proceeds, and the disc 20 and any resistance elements put in series with it in the circuit are so calculated that, under normal battery voltage, very little current will pass between the blocks 17 and 16, but as soon as the battery becomes fully charged and its terminal volts rise substantially, the increased voltage applied to the disc 20 is sufficient to cause a very large increase in the current flow. The consequence is that the heating effect of the current is much increased and after a time the temperature of the block 16 rises to a point at which the easily fusible alloy 25 melts. As soon as this occurs the shaft 26 is free to rotate, the ratchet wheel 27 rotates with it under the effort exerted by the spring 34 and thus the plunger 29 is withdrawn from the micro-switch 36 and the charging circuit is broken.

The parts are so proportioned and the resistance in series with the blocks 16, 17 is so chosen that the time which elapses between the battery voltage rising and the release of the switch is adequate to afford a suitable amount of overcharge for the battery.

When the battery has been cut-out the block 16 containing the fusible alloy 25 begins to cool down again, the alloy 25 solidifies, and thereafter, if the push-button is pressed in again, the charging operations can be repeated.

It will be seen that the device re-solidifies automatically after it has been operated, it affords a suitable degree of overcharge, it is shock and vibration proof and of exceedingly simple and robust construction.

The variable resistance 42 included in series with the blocks 16, 17 enable the time of overcharge to be varied as required.

The contacts of the micro-switch 36 are preferably connected to a separate relay 44 as shown for breaking the charging circuit.

I claim:

1. A battery charging control device having in combination contacts operable to cut off battery charging current, means to set the contacts for charging, means to operate the contacts to cut off charging which comprise a thermally responsive element, and means for applying heat to said element dependent upon battery voltage which comprise a resistance element which has a non-linear voltage characteristic so that it gets hot quickly as soon as the voltage applied to it exceeds a critical amount so that after a time the element will respond and allow the contacts to operate to cut off the charging current.

2. A battery charging control device as claimed in claim 1, wherein a variable resistance is included in series with the resistance element for the purpose of enabling the time of operation of the device to be pre-set.

3. A battery charging control device having in combination contacts operable to cut off battery charging current, means to set the contacts for charging and means to operate the contacts to cut off charging which comprise a thermally-responsive element and a resistance element in heat conductive relation to the thermally-responsive element, the resistance element having a non-linear voltage characteristic so that it gets hot quickly as soon as the voltage applied to it exceeds a predetermined value.

4. A battery charging control device as claimed in claim 3 having in series with the resistance element a variable resistance which can be set to enable the time of operation of the control device to be varied.

5. A battery charging control device as claimed in claim 3, wherein the thermally-responsive element consists of a block of readily fusible metal and an element held by said block from movement as long as the metal is in the solid state, but free to move when the metal is melted, the said element held by said block being operatively connected to the contacts.

6. A battery charging control device as claimed in claim 3, wherein the thermally-responsive element consists of a block of readily fusible metal and a movable element held by said block from movement so long as the metal is in the solid state, but free to move when the metal is melted, the resistance element being located in heat-transferable relation to said readily fusible metal and the combination of fusible metal, movable element and resistance element being enclosed in a thermally-insulated casing.

References Cited in the file of this patent

UNITED STATES PATENTS

| | | |
|---|---|---|
| 729,323 | Garrett | May 26, 1903 |
| 937,332 | Richardson | Oct. 19, 1909 |
| 1,210,331 | Kuhn | Dec. 26, 1916 |
| 1,500,268 | Replogle | July 8, 1924 |
| 1,507,300 | Replogle | Sept. 2, 1924 |
| 1,738,540 | Replogle et al. | Dec. 10, 1929 |
| 2,012,903 | Beetem | Aug. 27, 1935 |
| 2,286,340 | Bulpitt | June 16, 1942 |
| 2,314,863 | Brown et al. | Mar. 30, 1943 |